United States Patent [19]

Williamson

[11] 4,350,443
[45] Sep. 21, 1982

[54] OPTICAL FRINGE ANALYSIS

[75] Inventor: Tommy L. Williamson, Centerville, Ohio

[73] Assignee: The United States of America as represented by the Secretary of the Air Force, Washington, D.C.

[21] Appl. No.: 162,555

[22] Filed: Jun. 24, 1980

[51] Int. Cl.$^3$ .......................... G01B 11/00; G02B 5/32
[52] U.S. Cl. ............................... 356/358; 250/237 G; 350/3.7; 350/162 SF
[58] Field of Search ................. 356/358, 347; 350/3.7, 350/3.72, 162 SF; 250/237 G

[56] References Cited

U.S. PATENT DOCUMENTS 3,563,652   2/1971   Powell et al.

OTHER PUBLICATIONS

Sieve et al., "In-Plane Motion Measurements with Fourier Lensless Holography", Applied Optics, vol. 19, No. 10, May 15, 1980, pp. 1570–1571.

Abramson, N., "The Holo-Diagram-10: A Practical Device for Simulating Fringe Patterns in Hologram Interferometry", App. Optics, vol. 10, No. 91, pp. 2155–2161, Sep. 1971.

Shaalan et al., "Multiple Beam Holographic Interferometry", Optics Acta, vol. 25, No. 11, pp. 1025–1034, 1978.

*Primary Examiner*—John K. Corbin
*Assistant Examiner*—Bruce Y. Arnold
*Attorney, Agent, or Firm*—Donald J. Singer; Casimer K. Salys

[57] ABSTRACT

An apparatus for measuring in-plane surface displacement utilizing speckle diffraction interferometry. A double exposure specklegram is incrementally illuminated with a narrow laser beam. The diffraction pattern created upon passing through the specklegram strikes a mask having a variable transparency pattern covering a range of spatial frequencies. The correlation of the diffraction pattern and mask pattern projects through the mask and is optically integrated along lines of constant spatial frequency. The intensity of the luminous energy line created thereby represents the degree of correlation. The peak intensity, as measured by a calibrated linear detector array, corresponds to the spatial frequency of that point on the specklegram and the surface displacement between speckle recordings. Orientation of the displacement at each specklegram increment is obtained by using a dove prism to rotate diffraction pattern until a maximum spatial frequency is observed.

7 Claims, 6 Drawing Figures

OPTICAL FRINGE ANALYSIS

RIGHTS OF THE GOVERNMENT

The invention described herein may be manufactured and used by or for the Government of the United States for all governmental purposes without the payment of any royalty.

BRIEF SUMMARY

The present invention is directed to an apparatus for measuring in-plane surface displacements utilizing the technique known as speckle diffraction interferometry. The diffraction pattern created when a double exposure specklegram is subjected to laser illumination contains a vector measure of the surface displacement. However, recovery of the displacement data must be performed incrementally. Heretofore, each increment was measured manually or by Fourier transform in a computer to obtain the spatial frequency, displacement, and the angular orientation.

The invention overcomes the voluminous data handling problem, inherent in performing transformations at each of thousands of the incremental spots, by utilizing optical techniques. The diffraction pattern spatial frequency content is correlated with a mask having a contrast pattern covering a range of spatial frequencies. The correlation results are then integrated optically along lines of constant spatial frequency in search of maximum spatial frequency correlation, represented by the peak luminous energy intensity. The output of the integration, in the form of a luminous energy line of varying intensity, is sensed by a calibrated linear array to detect the point of peak intensity, and thereby the spatial frequency of the specklegram interference pattern.

The angular orientation of the displacement at the illuminated point on the specklegram is obtained by rotating the interference pattern until the maximum spatial frequency is detected in the array system. A synchronized dove prism in the interference pattern beam exemplifies a structural embodiment of that function.

The axis of the laser beam contains a large intensity, zero frequency, DC component as it projects through the apparatus. Since this component serves no useful purpose and degrades spatial frequency selectivity at the detector array, its suppression is useful. Locating an opaque region on the beam axis, between the specklegram and the detector array, adequately removes this deleterious constituent from the beam without measurably degrading the apparatus performance.

DETAILED DESCRIPTION

Considerable interest has been kindled over the past several years in applying holographic interferometry and specklegram interferometry to the analysis of samples in the course of non-destructive testing and non-destructive inspection. The theoretical concepts underlying in-plane displacement analysis utilizing specklegram interferometry have evolved to a level where quantitative measurements are readily attainable. Three technical publications which fully elaborate the development in the art preceeding this invention are: *A Study of the Parameters Associated with Employing Laser Speckle Correlation Fringes to Measure In-Plane Strain,* technical report AFFDL-TR-72-20, by Frank D. Adams in March 1972; *On Speckle Diffraction Interferometry for Measuring Whole Field Displacements and Strains,* AFFDL-TR-73-123, by Frank D. Adams et al. in December 1973; and *Specklegram Data Reduction Using Optical and Digital Techniques,* AFAL-TR-77-203, by Charles R. Lane in November 1977. All three were issued by the U.S. Air Force at Wright-Patterson AFB, Ohio.

Figure 1:
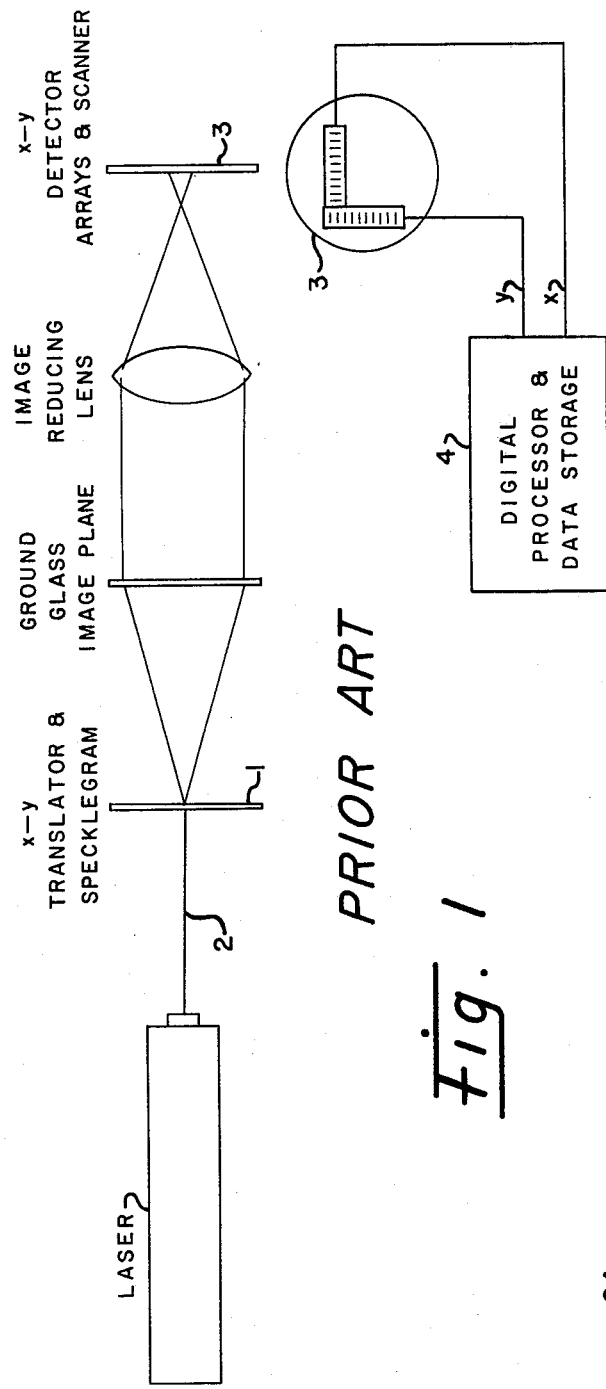
FIG. 1 schematically depicts a prior art means for analyzing specklegrams.

The techniques developed in the course of these investigations suffer from one significant deficiency, the great effort necessary to process the inordinate quantity of data generated during the analysis of the full specklegram. The latter of the three publications, exemplifies an effort undertaken to automate the reduction of the specklegram fringe data into units of in-plane displacement. Briefly, with reference to FIG. 1, the technique entails an incremental scan of specklegram 1 by narrow laser beam 2, with the intensity profile of the pattern at each increment also scanned by an X-Y array system, 3, and reduced for storage utilizing digital processor 4. When one recognizes that the incremental sampling of specklegram 1 can entail a nominal 40,000 points, the magnitude of the data handling and reduction problem becomes clear. The conventional digital processing technique taught in the latter publication is functionally operable, though the cost and complexity are not particularly appealing.

The invention taught herein undertakes the analysis of specklegram fringes using optical techniques. It recognizes that each of the multiplicity of specklegram incremental sample points will have to be analyzed; however, the results at each point should be a single vector commodity having units of in-plane displacement and its orientation. The apparatus and techniques taught herein derive a measure of in-plane displacement by determining translation from the specklegram spatial frequency content. A method and apparatus for determining the displacement orientation is also described.

Figure 2:
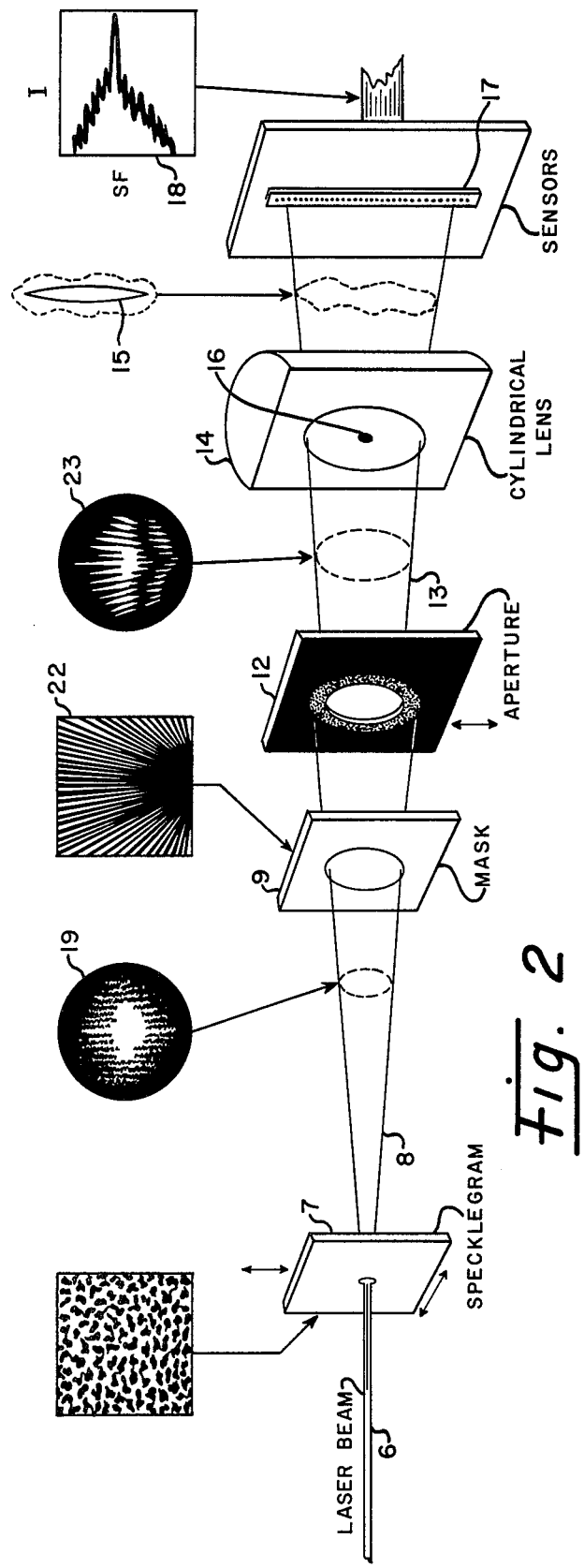
FIG. 2 shows in schematic form one embodiment of the invention.

Attention is now directed to FIG. 2, where the invention is depicted by way of an embodiment amenable to description and understanding. As shown, a coherent, collimated laser beam 6 illuminates a 1–2 mm circular area of specklegram 7. The specklegram is the reproduction of a double exposure, before and after strain effects, of a diffusive surface on a photographic negative using laser illumination in the manner described by the aforementioned technical publications. As is represented by the arrows, the specklegram is incrementally translatable, so that beam 6 may illuminate any point thereon.

Translations of the speckle pattern between photographic exposures causes diffraction interference in the area illuminated, which interference creates a projected beam 8 having a grating-like intensity pattern with a defined spatial frequency content. Beam 8 is projected through mask 9 having a fan-like contrast pattern. It will become apparent at a point hereinafter that the preferred pattern varies sinusoidally in contrast, and further, that the shape of the pattern has constant spatial frequency when translating laterally across the mask. Mask 9 is fixed with respect to beam 6.

Immediately after mask 9 is a circular aperture, 12, with the capability of limited vertical translation. The aperture suppresses extraneous modes of diffraction interference, allowing the passage of beam 13, that being a correlation of beam 8 with the pattern on mask 9. The composition of beam 13 will be described in detail during the theoretical development of the correlation.

Patterned beam 13 then strikes the flat face of vertically aligned cylindrical lens 14. An opaque spot, 16, in the center of projected beam 6 removes the high intensity zero frequency element of the beam. The horizontal integration performed by lens 14 generates a varying intensity linear beam, 15, of vertical alignment at the lens focus on linear detector array 17.

The individual elements in array 17 respond in proportion to the intensity of the luminous energy incident thereupon. An electronic scan of the array produces a signal amplitude profile of the form depicted in graph 18, where I represents intensity and SF represents spatial frequency. As will be shown by the theoretical development, the peak intensity I corresponds to the spatial frequency of the specklegram pattern in beam 8, which itself is directly relatable to the magnitude of in-plane translation between exposures.

Undoubtedly one recognizes spatial frequency determined by the location of the intensity peak along detector array 17 represents but one incremental point on specklegram 7. As such, the specklegram must be indexed vertically and horizontally with respect to stationary beam 6, so that each point is illuminated, analyzed and recorded. In this way the spatial frequency or displacement at each point on the surface of the specklegram is determined.

It is also apparent from FIG. 2 that detector array 17 may extend above and below the area of illumination depicted. Such extensions process translations of luminous energy accompanying vertical relocations of aperture 12.

The functions and structures described heretofore presume a substantial vertically placed alignment, in rotation about the beam axis, between the grating-like composition of the beam pattern, depicted at 19, and the fan-like contrast pattern on mask 9. However, since unidirectional displacement patterns throughout the specklegram are unlikely to occur, a pattern rotating element, such as dove prism 21 in FIG. 3, allows controlled and measurable alignment of the patterns. Since the beam pattern is rotated at precisely twice the rate of prism 21, measurement of the prism rotation provides the angular constituent to the vector in-plane strain at each illuminated point on specklegram 7. Referring back to FIG. 2 momentarily, alignment of the two patterns is detected in array 17 by sensing the maximum spatial frequency of the intensity peak as the prism is rotated.

With a basic understanding of the apparatus and its utilization at hand, it is necessary to develop the underlying theoretical foundation if the nuances of the invention are to be fully contemplated. The details of mask 9 are one example; a holographic embodiment of the apparatus is another.

From the teachings in the cited prior art it is evident that the specklegram under consideration is a photographic recording of a double exposure of an object, where the speckle itself is created by using laser illumination on an object with a diffuse surface. If the object has undergone a surface displacement between the exposure, either due to external forces or gross displacement, this information is recorded in the specklegram.

The speckle is, in effect, a random sampling function whose sample size is small compared to the areas under investigation. The size of the speckle is controlled by the recording optics. The speckled image of an object can be represented by $$\sum_{x_i, y_j} I(x_i, y_j)\delta(x - x_i, y - y_j) \tag{1}$$

where $I(x,y)$ represents the unspeckled image of the object and the delta function represents the individual speckle. The delta function is used since the speckle is small compared to the minimum resolution of the image that is being investigated.

The second exposure on the film can be represented by the similar expression:

$$\sum_{x_k, y_l} I(x_k, y_l)\delta(x - x_k, y - y_l) \tag{2}$$

where the summation is now taken over the second set of speckles. For small surface displacements, the positions of the speckles on the second image are related to those of the first by:

$$x_k = x_i + \Delta x; \; y_l = y_j + \Delta y \tag{3}$$

where $\Delta x$ and $\Delta y$ represent the displacement in the two coordinate directions. The field for the second exposure is then written as:

$$\sum_{x_i, y_j} I(x_i + \Delta x, y_j + \Delta y)\delta(x - x_i - \Delta x, y - y_j - \Delta y) \tag{4}$$

Recognizing that the photographic recording process is a square law process results in a total exposure for a unit time given by:

$$E(x, y) = \sum_{x_i, y_j} ([I(x_i, y_j)\delta(x - x_i, y - y_j)]^2 + \tag{5}$$

$$[I(x_i + \Delta x, y_j + \Delta y)\delta(x - x_i - \Delta x, y - y_j - \Delta y)]^2)$$

The summation has been taken outside of the brackets since the cross product of delta functions is zero unless the arguments are equal.

Since the specklegram is being used only for a point to point comparison of the surface displacement, the area of interest at any one time is small compared to the details of the image. For this reason, the image function can be considered a constant over each area of interrogation. Thus, over a small area the exposure function can be represented by:

$$E(x, y) = K \sum_{x_i, y_j} (\delta(x - x_i, y - y_j))^2 + \tag{6}$$

$$(\delta(x - x_i - \Delta x, y - y_j - \Delta y))^2$$

where K is the constant value for the image function over the area. The exposed film consists of a collection of delta function type sampling functions whose positions are determined by the relationship of equation 6. The granular nature of the photographic emulsion dictates that either the silver particle exists at a given location or it does not, therefore, the squaring of the delta functions has no significance in the image that is recorded. The resultant recorded image in the small area can be represented by:

$$E(x, y) = K \sum_{x_i, y_j} (\delta(x - x_i, y - y_j) + \quad (7)$$

$$\delta(x - x_i - \Delta x, y - y_j - \Delta y))$$

The specklegram then consists of an array of speckle sampling functions (represented by the delta functions) whose positions reflect the displacement that occured between exposures. Each of these speckles is recorded in the form of an absorptive silver particle or collection of silver particles. It will be assumed for simplicity that the film is completely absorptive at a speckle position. This assumption does not affect the form of the result, but rather only the multiplicative constant. The transmission of the film can then be written in the form:

$$T(x, y) = 1 - \sum_{x_i, y_j} (\delta(x - x_i, y - y_j) + \quad (8)$$

$$\delta(x - x_1 - \Delta x, y - y_j - \Delta y))$$

$$= 1 - (\delta(x, y) +$$

$$\delta(x - \Delta x, y - \Delta y)) * \sum_{x_i, y_j} \delta(x - x_i, y - y_j)$$

where * represents the convolution operation.

The specklegram is analyzed by illuminating each individual area by a small collimated laser beam and observing the resultant far field pattern. The amplitude of the field existing in the far field region of the area being analyzed will be the Fourier transform of the field existing at the exit aperture of the film. If the field used for the illumination is of unit amplitude then the exit field is represented by the expression of equation 8. The field in the far field region can be obtained by taking the Fourier transform of this expression.

$$E_{ff}(x_1, y_1) = \mathcal{F}[T(x,y)] \quad (9)$$

On performing the Fourier transform term by term the field that exists in the far field can be represented by the expression:

$$E_{ff}(x_l, y_l) = \delta(x_l, y_l) + 2e^{-i(\Delta x x_l + \Delta y y_l)} \quad (10)$$

$$\text{Cos}[(\Delta x x_l + \Delta y y_l)/2] \sum_{x_i', y_j'} \delta(x_l - x_i', y_l - y_j')$$

The first term represents the DC or transmitted beam and the second term is a set of speckled cosine fringes. The period of the cosine fringe pattern represents the displacement that occured between exposures and is the desired parameter to be measured. The series of delta functions is the transform of the series that existed in the exit aperture and is merely the speckle that appears in the observed pattern. The phase term will not be of importance for the cases when the intensity of the far field is observed rather than its amplitude. A typical far field intensity pattern is shown at reference number 19 in FIG. 2.

At this point, several observations can be made which may prove to be of benefit in establishing any generalized techniques for specklegram analysis. First, the speckle will be present at all stages of the analysis unless averaging techniques are applied to eliminate it. Its size can be controlled through proper choice of both the construction and analysis optics so that its effect may be minimized in the analysis. The far field pattern is not general, but rather a series of cosine fringes. For this reason, a generalized analysis of the pattern is not required. And finally, the desired information can be obtained from only the fringe spacings and their orientation.

In the foregoing it was shown that the fringe system resulting from a specklegram is, or at least can be made to be, a series of speckled cosine fringes. Since the far field pattern is an even function, the Fourier cosine transform can be used to determine the relationship between fringe pattern and the speckled double image. In the same manner the Fourier cosine transform can be used to analyze the fringe pattern itself. The fringe pattern is of the form A Cos ($k_o x$), where A is the arbitrary amplitude and $k_o$ is the radian frequency of the pattern. If, in fact, the expression for the total fringe distribution is expanded in a cosine series, only one term would have a non-zero coefficient, that corresponding to the proper spatial frequency. The general form for the coefficients of the cosine series expansion is:

$$a_x = \int_{-\infty}^{\infty} A\text{Cos}(k_o x)\text{Cos}(k_x x) \, dx \quad (11)$$

This operation is easily implemented, since it consists merely of multiplying the fringe pattern by a cosine function and integrating over the variable x. If a mask is constructed with transmission given by Cos ($k_1(y+b)x$), then the product of the incident fringe pattern (when properly aligned) and this transmission function would be the integrand of equation 11. The integral of the expression over the x variation would be a function of y and would represent the coefficient of the corresponding cosine term in the expansion. The expression would be:

$$a_x(y) = \int_{-\infty}^{\infty} A\text{Cos}(k_o x)\text{Cos}(k_1(y + b)x) \, dx \quad (12)$$

This expression would have a non-zero value only when:

$$k_o = k_1(y+b) \quad (13)$$

Thus, the y value for which a non-zero value was obtained would be a measure of the fringe spacing.

In reality the aperture over which the fringe pattern exists is not infinite, resulting in the expression:

$$a_x(y) = \int_{-D}^{D} A\text{Cos}(k_o x)\text{Cos}(k_1(y + b)x) \, dx \quad (14)$$

$$= \int_{-\infty}^{\infty} P_D(x)A\text{Cos}(k_o x)\text{Cos}(k_1(y + b)x) \, dx,$$

where 2D is the aperture diameter in the x direction and $P_D(x)$ takes on the value of 1 for $-D<x<D$ and is zero elsewhere. The effect of this non-infinite aperture is that instead of a delta function occurring at the value of y for which equation 13 holds, the function $a_x(y)$ is the Fourier transform of $P_D(x)$ and is centered at the previous value of y. This extends in the y direction since the y variation is a measure of the x spatial frequency.

$$a_x(y) = \frac{2 \sin(k_l D(y + b))}{k_l(y + b)} \qquad (15)$$

This function determines the ultimate resolution of the technique as a function of the aperture size or the number of fringes analyzed.

In reality, the transmission of the mask does not have to be a pure cosine function. It is only required that it have a fundamental cosine frequency sufficiently strong that the location of its maximum can easily be determined on the y-axis. Therefore, even a square wave variation is adequate. Mask 9 in the embodiment of FIG. 2 is an example of the latter square wave contrast configuration. Ideally, however, the contrast would vary sinusoidally.

Again with reference to FIG. 2, the product of mask pattern 22 with fringe pattern 19 in beam 8 produces a Moire' fringe system, 23, representing a measure of the correlation between patterns 19 and 22. Aperture 12 constrains output beam 13 to the spatial frequencies of interest. Nevertheless, the pattern created, 23, is not easily measured with an E-O device to ascertain quantitative results. Though careful observation shows the distinct presence of a correlation between patterns 19 and 22, the automated measurement of the spatial frequency information contained therein has yet to be defined.

To automate the extraction of spatial frequency data from correlation pattern 23 it is necessary to transform the pattern into a single dimension. Cylindrical lens 14 performs that function by integrating the pattern field along the direction of the fringe propagation, producing a varying intensity line pattern, 15. The interest in such a transformation evolves from the correspondence of the peak correlation in pattern 23 with the peak intensity on line pattern 15.

An opaque area 16 is shown on the face of cylindrical lens 14. Its function is to suppress the zero frequency, DC component of the projected correlation pattern. Undoubtedly, it may be located anywhere between specklegram 7 and cylindrical lens 14, as long as its position corresponds to the pattern zero frequency.

The intensity profile of line pattern 15 is sensed by detectors in linear array 17. A typical plot of detector electrical response verses displacement along the array is depicted in plot 18. The plot scale may, however, use the corresponding units of I for intensity and SF for spatial frequency. The peak response corresponds to the maximum correlation, and accordingly, designates the spatial frequency of specklegram at the point illuminated.

Figure 3:
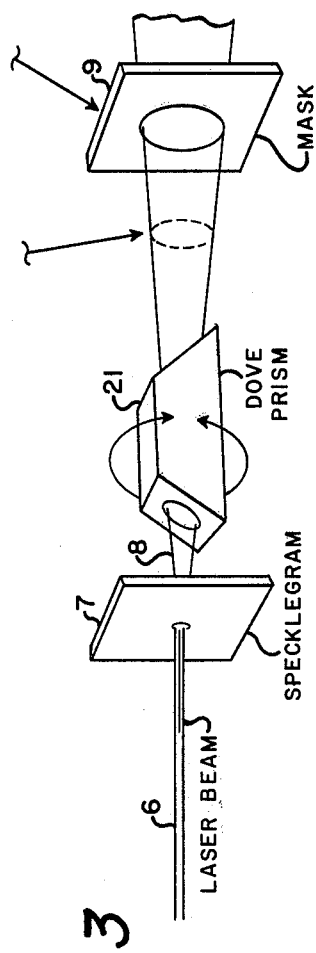
FIG. 3 schematically presents a refinement to the embodying apparatus.

The obvious ease with which spatial frequency determination can be electronically automated is not lost when dove prism 21, shown in FIG. 3, is utilized to rotate pattern 19. Synchronized rotation of the prism merely translates the peak in regulated fashion. The maximum spatial frequency attainable on array 17 defines both the spatial frequency and its angular orientation.

Figure 4:
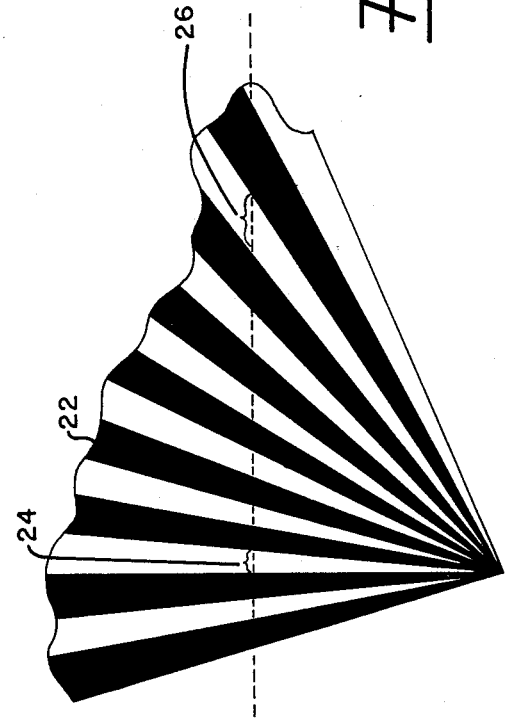
FIG. 4 illustrates a constraining characteristic of the apparatus mask pattern.

At this point it may be worth noting that some care should be exercised in the formation of the opaque regions in mask 9. As was noted previously, a cosine function variation in contrast is preferred. A further consideration is the relative spacing between segments of the fan-like pattern. Undoubtedly one skilled in the art now recognizes that the range of spatial frequencies in the mask should be adequate to correlate with all patterns 19. It is also useful if the vertical organization, with respect to the view in FIG. 2, exhibits constant spatial frequency along a horizontal line projected across the pattern. As is illustrated in FIG. 4, the spatial frequency at 24 differs from that at 26 when the fan-like segments are merely equal in angular increments.

Figure 5:
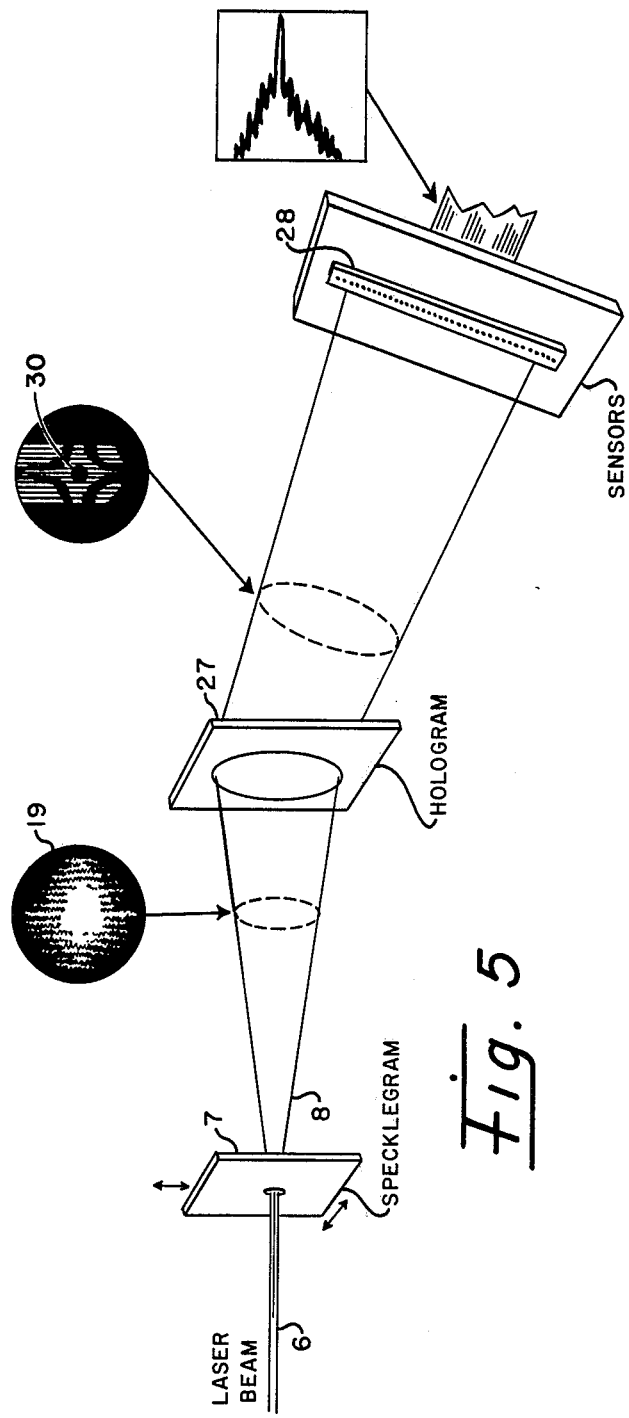
FIG. 5 schematically depicts a holographic embodiment of the invention.

A further refinement of the basic invention appears schematically in FIG. 5. Here specklegram interference pattern 19 is projected through hologram 27, containing both the fan-like mask and the cylindrical lens in a single element. The first order projection of the reconstruction from the hologram converges to a line on detector array 28. Again, the spatial frequency of interference pattern 19 corresponds to the peak electrical signal.

A dove prism or other means for rotating interference pattern 19 may be incorporated to determine the angular orientation of the displacement recorded in the specklegram. Generally, the aforementioned refinements and limitations, relating to FIG. 2, are applicable to the same extent in the holographic configuration. For instance, black spot 30 is the result of an opaque spot on hologram 27 removing the zero frequency component of the projected beam.

Figure 6:
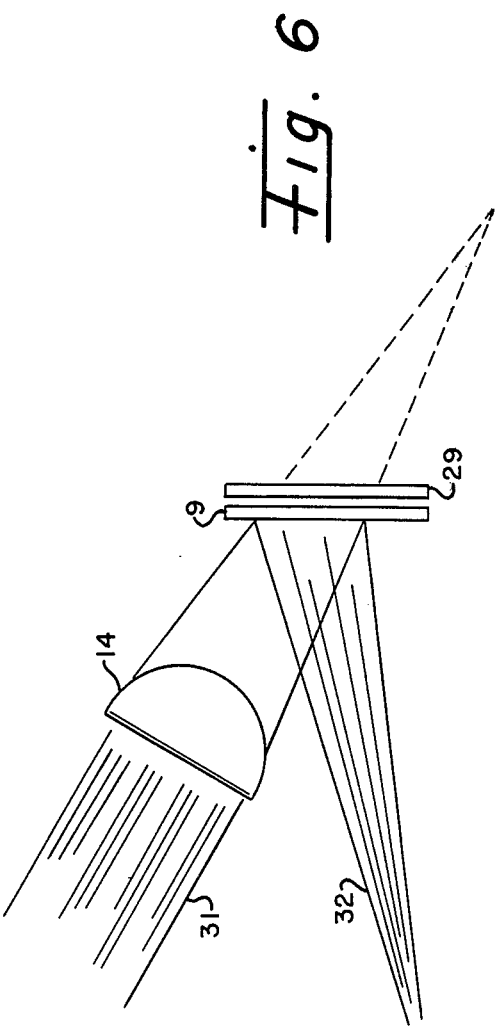
FIG. 6 illustrates the making of the hologram.

One method of creating hologram 27 is depicted in the schematic of FIG. 6. The hologram film is exposed to coherent light beams 31 and 32. Beam 31 first passes through cylindrical lens 14 and then through fan-like mask 9. Beam 32, on the other hand, merely passes through mask 9; however, it diverges at an angle similar to beam 8 in FIG. 2. The interference at film 29 creates a hologram containing the effects of both the lens and the mask.

I claim:

1. An apparatus for measuring surface displacement using specklegram interferometry, comprising:
    a means for generating a two-dimensional specklegram interference pattern in a coherent light beam;
    a mask means for correlating spatial frequencies in the interference pattern with a pattern of known composition positioned in the path of the patterned beam;
    a means for optically integrating the correlated pattern, along lines of constant spatial frequency, to generate a single varying intensity; and
    a means for incrementally sensing light intensity along the length of the line formed by the optical integration.

2. The apparatus recited in claim 1, wherein:
    said means for generating an interference pattern comprises a laser beam projected through a specklegram, said mask means for correlating comprises a fan-like pattern of segments varying in transparency, said means for optically integrating comprises a cylindrical lens, and said means for incrementally sensing comprises a linear array of detectors.

3. The apparatus recited in claim 2, wherein:

the segments in the mask means vary sinusoidally between transparent and opaque states, and the spatial frequency of the segments is constant along the lines of constant spatial frequency.

4. The apparatus recited in claim 1, wherein:

the mask means and means for optically integrating are combined in a hologram which is inserted into the path of the patterned beam; and the means for incrementally sensing is positioned at an oblique angle with respect to the path of the patterned beam.

5. The apparatus recited in claim 4, wherein: the hologram combines a mask means having a fan-like pattern of segments varying in transparency, and a cylindrical lens for optically integrating.

6. The apparatus recited in claims 1, 2, 3, 4 or 5, further comprising:

a dove prism in the path of the patterned beam for rotating the patterned image.

7. The apparatus recited in claims 1, 2, 3, 4 or 5, further comprising:

a means for obstructing the passage of the zero frequency element of the projected beam.

* * * * *